United States Patent [19]

Bausewein et al.

[11] Patent Number: 5,482,779
[45] Date of Patent: Jan. 9, 1996

[54] LABEL AND PROCESS FOR MANUFACTURING A LABEL

[75] Inventors: Volker Bausewein; Dieter Ludebühl, both of Rothenberg, Germany

[73] Assignee: Esselte Meto International Produktions GmbH, Hirschhorn, Germany

[21] Appl. No.: 177,594

[22] Filed: Jan. 5, 1994

[30] Foreign Application Priority Data

Jan. 9, 1993 [DE] Germany ................ 43 00 411.3

[51] Int. Cl.⁶ .................................. B41M 5/10
[52] U.S. Cl. .................. 428/488.4; 428/40; 428/42; 428/43; 428/174; 428/187; 428/195; 428/411.1; 428/458; 428/461; 428/464; 428/481; 428/507; 428/537.5; 428/692; 428/900; 428/914
[58] Field of Search .................. 428/40, 354, 195, 428/913, 914, 208, 206, 488.4, 42, 43, 174, 187, 411.1, 458, 461, 464, 481, 507, 537.5, 692, 900, 914; 427/130

[56] References Cited

U.S. PATENT DOCUMENTS

| | | | |
|---|---|---|---|
| 3,995,087 | 11/1976 | Desanzo | 428/315 |
| 4,526,405 | 7/1985 | Hattemer | 283/81 |
| 5,019,436 | 5/1991 | Schramer et al. | 428/40 |
| 5,079,058 | 1/1992 | Tomiyama et al. | 428/40 |

FOREIGN PATENT DOCUMENTS

| | | |
|---|---|---|
| 0295028 | 12/1988 | European Pat. Off. . |
| 1584869 | 1/1970 | France . |
| 7040322 | 2/1971 | Germany . |
| 2253730 | 5/1973 | Germany . |
| 7930564 | 2/1980 | Germany . |
| 3322099 | 12/1984 | Germany . |
| 8402083 | 4/1985 | Germany . |
| 3712766 | 6/1988 | Germany . |
| 3902012 | 7/1990 | Germany . |
| 3941257 | 6/1991 | Germany . |
| 4025746 | 2/1992 | Germany . |
| 9103824 | 9/1992 | Germany . |
| 430144 | 11/1974 | U.S.S.R. . |

*Primary Examiner*—Patrick J. Ryan
*Assistant Examiner*—William A. Krynski
*Attorney, Agent, or Firm*—Thomas N. Ljungman

[57] ABSTRACT

A label for use as a price tag on products has a printable recording medium which can be attached by adhesive to a carrier foil. The adhesive attachment can be provided by means of a laminated material having an adhesive action. To create a label which, by means of its adhesive layer, properly adheres to the product to be labelled, and which, after removal from the product, leaves behind no adhesive residue, the laminated material can be made to have an intermediate layer coated on both sides with adhesive, and which intermediate layer is configured to exert a stronger adhesive force on adhesive than the products to be labelled will exert on the adhesive. Further, the adhesive deposited on the side of the intermediate layer facing the carrier foil preferably has a lower adhesive strength than the adhesive deposited on the side of the intermediate layer facing the recording medium.

20 Claims, 3 Drawing Sheets

LABEL AND PROCESS FOR MANUFACTURING A LABEL

BACKGROUND OF THE INVENTION

1. Field of the Invention

This invention generally relates to a label material, for example, a material for making price tag labels or anti-theft labels which are placed on products at a store. The label material can have a first substrate on which information can be printed, which first substrate can be attached to a removable carrier sheet by means of a laminated material having an adhesive action. At least the side of the carrier sheet facing the laminated material can be coated with silicon to allow for relatively easy removal of the label from the carrier sheet prior to affixing the label to the product. The present invention also relates to a process for manufacturing the label.

2. Background Information

Label materials having the basic components as outlined above are generally known. In the most common form of label, the laminated material which exerts the adhesive effect generally consists of a simple layer of adhesive deposited on a printable recording medium, such as a paper. If such labels are removed from labelled products such as glass or porcelain products, for example, which products can typically exert a stronger adhesive force on the adhesive layer than does the recording medium, an adhesive residue can be left behind on the products. To eliminate the adhesive residue, attempts were initially made to use a laminated material consisting of two layers of adhesive. The first adhesive layer, or the layer in contact with the recording medium, was made from an adhesive with a very strong adhesive force, while the second adhesive layer facing the carrier sheet, or the product to be labelled, had only a weaker adhesive force. This second adhesive layer was generally weakened by adding a softener to the adhesive.

The use of such a double layer of adhesive initially had the positive effect that the labels adhered well to the labelled products, while still being removable from the labelled products without leaving adhesive residues behind. Over time, however, the softener within the second layer of adhesive tends to penetrate into the first layer of adhesive, i.e. the one which originally had the stronger adhesive force, so that this first layer of adhesive would lose its adhesive effect, and when the tag was removed, it was conceivable to find that more of the double layer of adhesive was left behind on the product than was on the labels when the labels were pulled off.

OBJECT OF THE INVENTION

The object of the present invention is to create a label which, by means of its adhesive layer, adheres well to the products to be labelled, and leaves essentially no adhesive residue when the label is pulled ,off, or removed from the products, even after a period of time.

SUMMARY OF THE INVENTION

The present invention teaches that the above object can be achieved by means of a laminated material which has an intermediate layer that is coated on both sides with adhesive. The intermediate layer is preferably configured such that the intermediate layer exerts a greater adhesive force on the adhesive than the adhesive would exert on the products to which the label was to be attached. Further, it can also be preferable that the adhesive which is deposited on the side of the intermediate layer facing the carrier sheet has a weaker adhesive strength than the adhesive which is deposited on the side of the intermediate layer facing the recording medium.

Such a label material can preferably be provided to the consumer attached to a carrier sheet, and it is preferable that the label material can be easily removed from the carrier sheet to expose the adhesive for attaching the label material to a product. By means of a label material configured according to the present invention, a label removed from the carrier sheet and applied to a product can then preferably be removed from the product without leaving any adhesive residue, even if the product exerts a greater adhesive force on the adhesive than does the recording medium of the label. This action is essentially provided as a result of there being an intermediate layer between the label and the product, which intermediate layer exerts a greater adhesive force on the adhesive than the adhesive does to the product to be labelled, thereby substantially preventing adhesive residue from remaining on the product.

To make certain that the intermediate layer adheres to the recording medium and not to the product when the label is removed from the product, the recording medium can preferably be attached to the one side of the intermediate layer by means of an adhesive which has a substantially greater adhesive strength than the adhesive on the other side of the intermediate layer, that is, the adhesive by means of which the intermediate layer adheres to the carrier sheet or to the product. In general, the adhesive used on both sides of the intermediate layer can essentially be of a similar adhesive composition, while the adhesive designated as having the lesser adhesive strength generally can preferably have a softener added thereto to make the adhesive have the lesser adhesive strength.

Another embodiment of the present invention provides that the intermediate layer is configured to prevent the softener, which can be added to the adhesive having the lesser adhesive strength, from penetrating into the adhesive which has the greater adhesive strength. As discussed previously, such a penetration, if it can occur, can reduce the adhesive strength of the latter over time, thereby increasing the likelihood that more adhesive will remain on the product than on the label when the label is removed. Therefore, the label material of the present invention can be used over longer periods of time with decreased concern that the adhesive will remain on the product after the label is removed.

The label according to the present invention can be manufactured economically if the intermediate layer is made from glassine paper or high-gloss paper, or if the intermediate layer is made from polyethylene sheet or aluminum foil. These materials generally exert a greater adhesive strength on adhesive than products to be labelled exert on the same adhesive.

The use of the laminated material according to the invention makes also makes possible the manufacture of theft-prevention labels, on which, on the printable recording medium, on the side facing the intermediate layer, can be deposited a nickel film, a polyester film and a thin layer of soft-magnetic material sputtered on the polyester film.

Generally, sputtered layers of soft magnetic material exert such a low adhesive force on adhesives designed as bonding emulsions, that any anti-theft labels which have the layers described above and which are glued by means of the sputtered layer directly onto the products to be labelled have been found to almost assuredly leave behind adhesive residues when they are removed from the products. Because of the minimal adhesive force between sputtered layers and bonding emulsions, an adhesive with a very strong adhesive force must generally be used, so that the anti-theft labels can even remain attached to the products to be labelled. If such an anti-theft label is then removed from the products, residues of this aggressive adhesive typically remain on the products, and can only be removed from the products with great effort.

The present invention, on the other hand, teaches that the sputtered layer of the anti-theft label can be glued to the intermediate layer by means of an aggressive adhesive, and that the intermediate layer can then be attached by means of an adhesive with a lower adhesive strength to the carrier sheet or to the product to be labelled. In this manner, the anti-theft label generally adheres well to the product to be labelled and can also be easily removed from the product without leaving adhesive residue behind.

Labels with the characteristics specified by the present invention can be manufactured economically if a primary laminated material is prepared which has a carrier sheet coated on both sides with silicon. On the carrier sheet, an intermediate layer with adhesive on both sides can then preferably be deposited, whereby the adhesive which is deposited on the side of the intermediate layer facing the carrier sheet can preferably have a weaker adhesive force than the adhesive which is on the side of the intermediate layer facing away from the carrier sheet. Since the carrier sheet can be coated on both sides with silicon, after the intermediate layer is deposited, the carrier sheet-intermediate layer substrate can then be wound into a roll, whereby the silicon on the intermediate layer will essentially allow for a later unrolling of the substrate for deposition of the printable recording medium thereon. In an additional manufacturing stage, a printable recording medium can then be applied to the side of the primary laminated material facing away from the carrier sheet, and the intermediate product manufactured in this manner can then preferably be wound up on a roll for storage, or for further processing.

The process according to the present invention also makes possible the manufacture of anti-theft labels on which a nickel film is deposited on the recording medium, and a polyester film is applied on top of the nickel film. On the side of the polyester film facing away from the recording medium, a thin layer of soft-magnetic material can also preferably be sputtered, that is, before the recording medium, with the nickel film, the polyester film and the sputter film is glued onto the primary laminated material. In this manner, it is possible to manufacture anti-theft labels which, in spite of the low adhesive strength of the sputter film towards an adhesive, adhere well to the products to be labelled, and can be easily removed from the products without leaving behind adhesive residue.

One aspect of the invention resides broadly in a self-adhesive label, such as a price tag label, for being adhered to a product. The label has a first side and a second side, and the label comprises a first material disposed on the first side of the label, the first material being configured for the printing of information thereon, and an intermediate material disposed on the second side of the label. The intermediate material comprises: a sheet material, the sheet material having a first side disposed towards the first material, and a second side disposed away from the first material; a first adhesive disposed on the first side of the sheet material, the first adhesive being configured for bonding the sheet material to the first material; a second adhesive disposed on the second side of the sheet material, the second adhesive being configured for bonding the sheet material to a product; the second adhesive being configured to have a first adhesive force for bonding to a product; and the sheet material comprising a material configured to have a second adhesive force for bonding to the second adhesive, the second adhesive force between the sheet material and the second adhesive being greater than the first adhesive force between the second adhesive and a product.

Another aspect of the invention resides broadly in a process for manufacturing a label, which label has a first side and a second side, and which label comprises: a first material disposed on the first side of the label, the first material being configured for the printing of information thereon; a peel-away backing material disposed on the second side of the label, the peel-away backing material comprising a coating thereon for minimizing adhesion of adhesives thereto; an intermediate material disposed between the first material and the peel-away backing, the intermediate material comprising: a sheet material, the sheet material having a first side disposed towards the first material, and a second side disposed towards the peel-away backing; a first adhesive disposed on the first side of the sheet material, the first adhesive being configured for bonding the sheet material to the first material; a second adhesive disposed on the second side of the sheet material, the second adhesive being configured for bonding the sheet material to a product. The method comprises the steps of: forming an intermediate material in a first processing stage, the forming the intermediate material comprising the steps of: providing the sheet material; configuring the first adhesive to have a stronger adhesive strength than an adhesive strength of the second adhesive; coating the first side of the sheet material with the first adhesive and coating the second side of the sheet material with the second adhesive; providing the peel-away backing; coating both the first side and the second side of the peel-away backing with said coating; and combining the sheet material with the peel-away backing, with the second adhesive of the sheet material in contact with the peel-away backing to form the intermediate material; providing the first material; and combining the first material with the intermediate material, with the first material in contact with the first adhesive of the peel-away backing to form an intermediate label product.

BRIEF DESCRIPTION OF THE DRAWINGS

Several embodiments of the invention are explained in greater detail below, with reference to the accompanying figures, in which.

DESCRIPTION OF THE PREFERRED EMBODIMENTS

Figure 1:
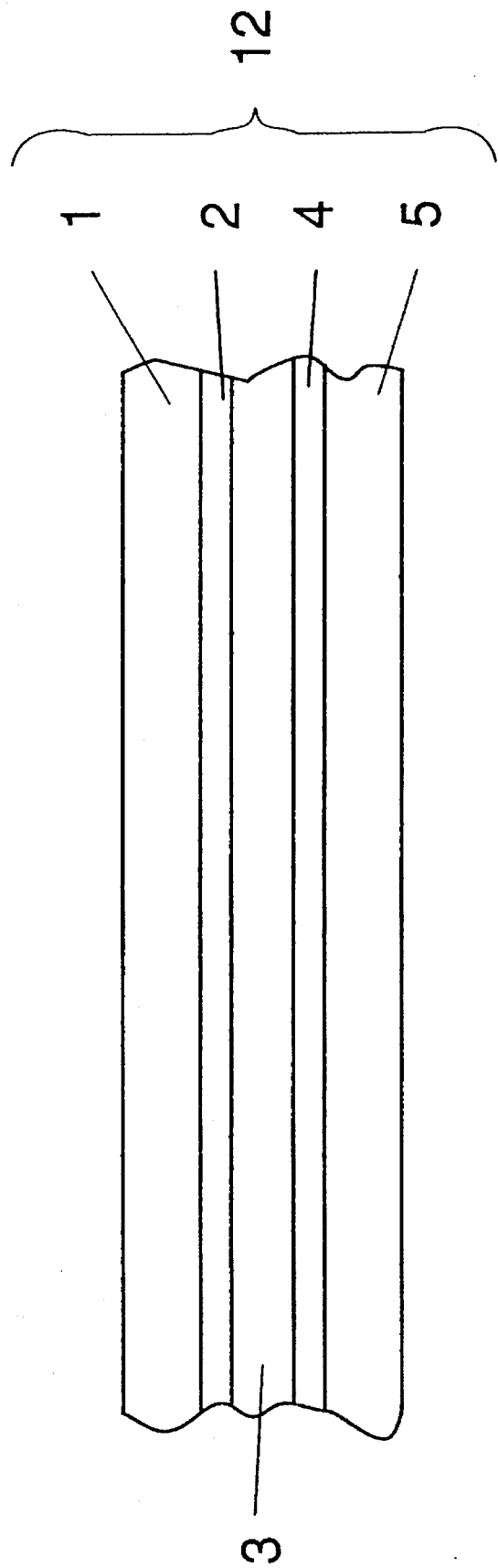
FIG. 1 is a cross section through a conventional label to which the laminated material according to the invention has been applied.

FIG. 1 shows a label in cross section which has a printable recording medium 1. This printable recording medium 1 can be conventional label paper, which can be printed upon by means of an inked printing plate. Alternatively, this medium 1 could also be a temperature-sensitive thermal label paper which can be printed upon by means of a thermal printer head. The recording medium 1 can also be made of film, such as a mechanically-printed plastic, for which purpose, polypropylene has been found to be particularly well-suited.

By means of an adhesive 2, designed as a bonding emulsion with a strong adhesive force, the recording medium 1 can preferably be applied to an intermediate layer 3. This intermediate layer 3 can preferably be of a material which exerts a strong adhesive action on bonding emulsions. The intermediate layer 3, on the other side thereof, can preferably be glued to a carrier sheet, or foil 5 by means of a second adhesive 4, also designed as a bonding emulsion, but with a relatively low adhesive strength. Some various types of adhesives which could be used for producing such an intermediate layer are described further below.

As mentioned above, it is preferable that the intermediate layer 3 be made of a material which has a strong adhesion to the bonding emulsions. In this regard, the intermediate layer 3 can preferably be made from one of, or even a combination of, the following materials: glassine paper, high-gloss paper, polyethylene film or aluminum foil. Such materials, when used as the intermediate layer, generally exert a strong adhesive force on bonding emulsions.

The carrier sheet, or foil 5, which can preferably be a throw-away backing material to allow for transport and storage of the labels, is preferably coated, at least on the side facing the recording medium 1, with silicone. The silicone essentially exerts a weak adhesive force on bonding emulsions, thereby enabling the carrier foil 5 to be easily pulled away from the intermediate layer 3. After removal of the carrier foil 5, the label can be attached to the products to be labelled by means of the exposed adhesive layer 4.

In an alternative embodiment, the carrier foil 5 can preferably be coated on both sides with silicone. By coating the carrier foil 5 on both surfaces with silicone, the manufacturer of labels according to the present invention can produce a primary laminated material which can serve as the base material for receiving a variety of printable materials thereon. To produce such an intermediate product, the intermediate layer 3 coated with adhesives 2 and 4 on opposite sides thereof can be deposited onto the carrier foil 5 which has preferably been treated with silicone on both surfaces thereof, with the adhesive 4 adjacent the carrier foil 5. The carrier foil 5 and intermediate layer 3 disposed thereon can then be rolled up into a roll, wherein the adhesive layer 2 will be brought into contact with the side of the carrier foil 5 facing away from the intermediate layer 3. Since the silicone layer also located on the side of the carrier foil 5 facing away from the intermediate layer 3 exerts a minimal adhesive action on the adhesive 2, the carrier foil 5 does not adhere to the intermediate layer 3 by means of the adhesive 2, and this intermediate product, or primary laminated material (having layers 2, 3, 4 and 5) can be unrolled for attaching a printable medium 1 thereto.

In this manner, the manufacturer can produce a supply of intermediate product which can then be kept in stock. A consumer, after deciding what type of label material would be best suited for a desired purpose, could then have the manufacturer attach a suitable printing medium 1 to the intermediate product to form a finished label. Alternatively, the consumer might also be able to purchase machinery for attaching a printing medium 1 to the intermediate product to thereby make their own customized labels at the consumers end.

Before the label, having components 1 through 5 according to the present invention can be applied to a product, the carrier foil 5 can preferably be pulled away by virtue of the silicon on the carrier foil 5. If the label applied to the product is then to be removed from the product, since the intermediate layer 3 exerts a much stronger adhesive force on the adhesive 4 than the product exerts on the adhesive 4, essentially all of the adhesive 4 will remain adhering to the intermediate layer 3, and substantially no adhesive residue will be left on the product. Under the best conditions, essentially all of the adhesive will remain adhering to the intermediate layer 3, and no adhesive will remain on the product.

Figure 2:
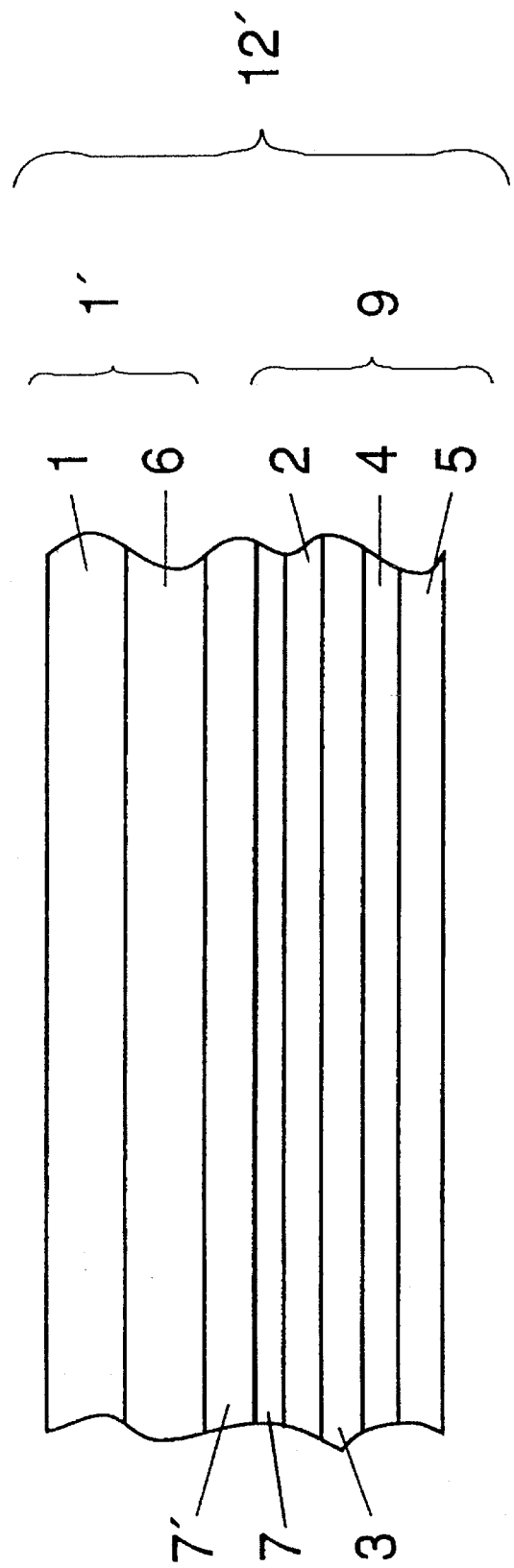
FIG. 2 is a cross section through an anti-theft label provided with the laminated material.

To manufacture an anti-theft label, such as the label illustrated in FIG. 2, the same primary laminated material can be used as for the conventional labels illustrated in FIG. 1. To recapitulate, this primary laminated material essentially is made up of the carrier foil 5, the adhesive 4 with low adhesive force, the intermediate layer 3 and the adhesive 2 with a strong adhesive force. In addition, the anti-theft label may also have a printable recording medium 1. On one side of the printable recording medium 1, that is the side facing the primary laminated material 2, 3, 4, 5, a nickel film 6 can preferably be applied. On top of this nickel film, that is, on the side of the nickel film 6 facing the primary laminated material 2, 3, 4, 5, there can preferably be a polyester film 7', along with a sputtered, thin layer 7 of a soft-magnetic material.

The label (having layers 1, 6, 7', 7, 2, 3, 4), is first separated from the carrier foil 5 before it is applied to a product to be labelled. If the label is then removed from the product, the adhesive 4 preferably adheres to the intermediate layer 3 and not to the product, on account of the relatively strong adhesive force between the intermediate layer 3 and the bonding emulsion, as discussed previously in relation to the embodiment of FIG. 1. In spite of the minimal adhesive force between sputtered layers and adhesive, the intermediate layer 3 can preferably remain adhering to the sputtered layer 7, since the adhesive 2 is one with a strong adhesion for that purpose.

If a product labelled with the anti-theft label illustrated in FIG. 2 is stolen and carried through a gate-type detector consisting of a transmitter and receiver coil, the label would be irradiated by the transmitter coil with an alternating electromagnetic field which can cause the soft-magnetic sputter film 7 to be remagnetized at the frequency of the alternating field. This remagnetization can thereby cause the film 7 to emit an alternating electromagnetic field. If such a field is received by the receiver coil, the theft alarm can be set off. If the item is paid for, the nickel film 6, which has hard magnetic properties, can be magnetized by means of a strong magnet so that the nickel film 6 for its part drives the soft magnetic sputter film 7 to magnetic saturation. Thus, the sputter film 7 can no longer react to alternating electromagnetic fields as described above, i.e. the sputter film 7 is deactivated. The products with the deactivated anti-theft label can then essentially be carried through the detector without setting off an alarm.

Figure 3:
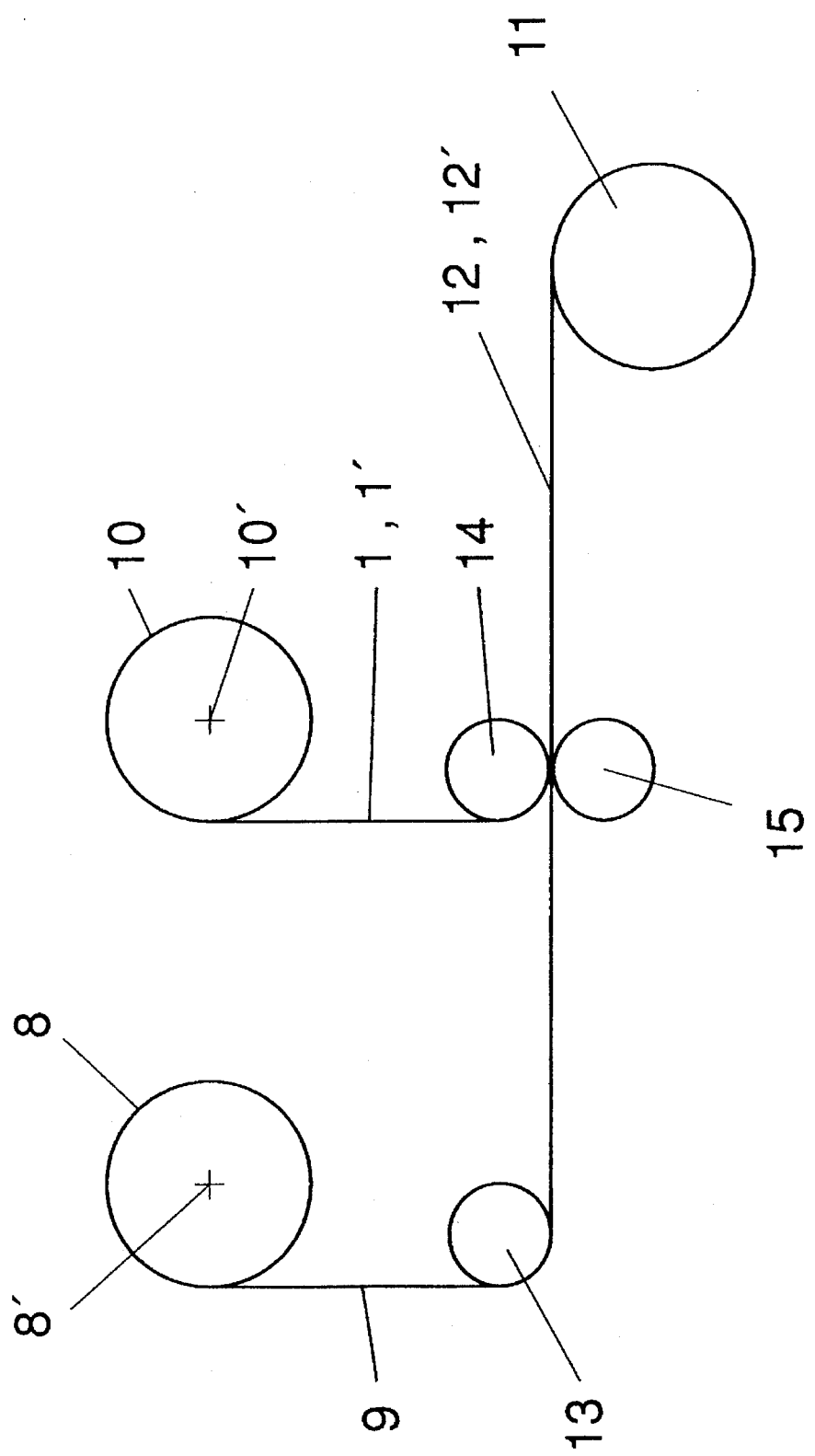
FIG. 3 is a schematic drawing of an apparatus for the manufacture of the labels according to the present invention.

An apparatus to manufacture labels of the types described above is schematically illustrated in FIG. 3. Such apparatus can preferably have a first payoff roll 8, on which the primary material (2, 3, 4, 5) can be disposed. It is preferable that primary material (2, 3, 4, 5) be wound so that the adhesive layer 2 comes into contact with the side of the intermediate layer 3 which faces the axis of rotation 8' of the first payoff roll 8. The apparatus can also preferably have a second payoff roll 10, about which the printable recording medium 1 can be wound. As discussed previously, the printable recording medium may also have an additional nickel film 6 and a polyester film 7' with a sputter film 7, which additional layer generally form the electromagnetically active portion 1' of an anti-theft label. This printable recording medium 1, with the possible additional layers 1', can preferably be wound on the second payoff roll 10 so that the sputter film 7 is on the side of the paper layer 1 facing away from the axis of rotation 10' of the second payoff roll 10. Further, the apparatus can also have a takeup roll 11, on which the products 12, 12', illustrated in cross section in FIGS. 1 and 2 can be rolled up, so that they can be transported for further processing, e.g. to a label press, or other appropriate device, wherein an imprint can be printed on the printable recording medium 1.

In manufacturing the assembled labels, the primary laminated material 9 can be unrolled from the first payoff roll 8 and transported by means of a first deflector roller 13 to a roller pair 14, 15. Substantially simultaneously, the recording medium 1, 1' can be unrolled from the second payoff roller 10 to the roller pair 14, 15. The rollers 14 and 15 are preferably disposed with roll axes which are parallel to one another and perpendicular to the direction of travel of-the primary laminated material 9. At the roller pair 14, 15, the recording medium 1, 1' is preferably pressed onto the primary laminated material 9, whereby the recording medium 1, or, alternatively, the sputter film 7 of the electromagnetically active part 1', is preferably glued by means of the adhesive layer 2 to the primary laminated material 9. The resulting assembled product 12, 12' can then be wound up on the takeup roll 11, and can be transported to a label press for further processing of the intermediate product, i.e. the printing of information on the recording medium 1.

One feature of the invention resides broadly in the label, in particular to a price tag on products, which consists of a printable recording medium 1 which is attached to a carrier foil 5 by means of a laminated material having an adhesive action, on which at least the side facing the laminated material is coated with silicon, characterized by the fact that the laminated material consists of an intermediate layer 3 coated on both sides with adhesive 2, 4, and which exerts a stronger adhesive force on adhesive than the products to be labelled, and by the fact that the adhesive 4 which is deposited on the side of the intermediate layer 3 facing the carrier foil 5 has a lower adhesive strength than the adhesive 2 which is deposited on the side of the intermediate layer 3 facing the recording medium 1.

Another feature of the invention resides broadly in the label, characterized by the fact that the intermediate layer 3 consists of glassine paper.

Yet another feature of the invention resides broadly in the label, characterized by the fact that the intermediate layer 3 consists of high-gloss paper.

Still another feature, of the invention resides broadly in the label, characterized by the fact that the intermediate layer 3 consists of polyethylene film.

Still yet another feature of the invention resides broadly in the label, characterized by the fact that the intermediate layer 3 consists of aluminum foil.

Yet still another feature of the invention resides broadly in the label, characterized by the fact that a nickel film 6, a polyester film 7' and a thin layer 7 of soft magnetic material sputtered on the polyester film 7' are deposited on the printable recording medium 1 in the direction of intermediate layer 3.

Yet another feature of the invention resides broadly in the process for the manufacture of labels, characterized by the following process steps:

a) A primary laminated material is prepared which consists of a carrier foil 5 coated on both sides with silicon, to which is applied an intermediate layer 3 provided with adhesive 2, 4 on both sides, whereby the adhesive 4 which is deposited on the side of the intermediate layer 3 facing the carrier foil 5 has a lower adhesive strength than the adhesive 2 which is on the side of the intermediate layer 3 facing away from the carrier foil 5;

b) a printable recording medium 1 is attached by means of adhesive to the side of the primary laminated material 2, 3, 4, 5 facing away from the carrier foil 5;

c) the intermediate product 12 manufactured in Process Step b) is wound onto a takeup roll 11 for additional processing.

Still yet another feature of the invention resides broadly in the process for the manufacture of labels, characterized by the fact that a nickel film 6 is deposited on the recording medium 1, and a polyester film 7' is deposited on top of the nickel film 6, and on the side of the polyester film 7' facing away from the recording medium 1, a thin layer of soft magnetic material is sputtered, before the recording medium 1 is glued by means of the nickel film 6, the polyester film 7' and the sputter film 7 to the primary laminated material 2, 3, 4, 5.

Some of the types of adhesives which could possibly be used for producing labels in accordance with the present invention are listed herebelow:

an elastomer-resin composition wherein the resin can be a hydrogenated ester and the elastomer can contain organic polyol and organic diisocyanate, as disclosed by U.S. Pat. No. 3,914,484 to Creegan and White, entitled "Pressure Sensitive Adhesive Labels and Method of Making"

a polythioether polymer containing liquid polyene compositions cured to polythiol elastomeric products, as disclosed by U.S. Pat. No. 3,92;0,877 to Barber et al., entitled "Fully-Cured Crosslinkable Pressure Sensitive Adhesive Materials and. Method of Making Same"

a composition of acrylic acid ester or polyvinyl ether in combination with acrylic acid or a derivative of acrylic acid, a plasticizer and an emulsifier, as disclosed by U.S. Pat. No. 4,033,918 to Hauber, entitled "Water Removable Pressure Sensitive Adhesive"

a thermoplastic block polymer in combination with a tackifying resin and a low saturated oil as disclosed by U.S. Pat. No. 4,097,434 to Coker, entitled "Adhesive Composition"

an ABA-type monoalkenyl arene/conjugated diene block copolymer in combination with an AB two-block copolymer, a tackifying resin and a compounding oil, as disclosed by U.S. DEFPUB T00203 to Lauck, entitled "Label Adhesive"

a polymer of vinyl or vinylidene monoaromatic monomer with conjugated diene unsaturated acid and an alkyl ester of methacrylic acid, as disclosed by U.S. Pat. No. 4,438,232 to Lee, entitled "Carboxylated Acrylate Styrene Butadiene Adhesives"

an ester of acrylic acid with ethylenically unsaturated carboxylic acid; a conjugated diolefin with vinyl aromatic monomer and ethylenically unsaturated carboxylic acid; and monoolefin, vinyl ester and ethylenically unsaturated carboxylic acid, as disclosed by U.S. Pat. No. 4,540,739 to Midgley, entitled "Adhesive Polymer Latex"

an acrylic copolymer component, such as an acetoacetyl group-containing acrylic copolymer, and a curing components such as an isocyanate or epoxy, as disclosed by U.S. Pat. No. 4,987,186 to Akiyama et al., entitled "Pressure Sensitive Adhesive Composition"

a polymer of an acrylic ester of a saturated alcohol, with a surfactant and dextrin, as disclosed by U.S. Pat. No. 5,004,768 to Mahil and Cruden, entitled Adhesive Composition and Self-Adhesive Sheet Material"

One type of intermediate layer material 3, in accordance with the present invention is "HERMA-Doppelklebeband 12N/32 T" and is being manufactured by HERMA Heinrich Hermann GmbH & Co., D-70794 Filderstadt, Germany. This intermediate layer is glassine paper with a thickness of about 56 micrometers and has a weight of about 55 g/sq. meter.

Some types of anti-theft labels made from magnetized, or magnetizable materials, which could possibly be made in accordance with the present invention, are disclosed by the following U.S. Patent: U.S. Pat. No. 4,799,045 to Fearon and Fearon, entitled "Method of Detecting a Label Used in an Anti-theft Surveillance System"; U.S. Pat. No. 4,652,863 to Hultman, entitled "Disarmable Magnetic Anti-Shoplifting Marker"; and U.S. Pat. No. 4,527,152 to Scarr and Fearon, entitled "Anti-Shoplifting System".

All, or substantially all, of the components and methods of the various embodiments may be used with at least one embodiment or all of the embodiments, if any, described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 43 00 411, filed on Jan. 9, 1993, having inventors Volker Bausewein and Dieter Ludebühl, and DE-OS P 43 00 411 and DE-PS P 43 00 411, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The appended drawings in their entirety, including all dimensions, proportions and/or shapes in at least one embodiment of the invention, are accurate and to scale and are hereby included by reference into this specification.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A self-adhesive label, such as a price tag label, for being adhered to, and removed from a product, said label comprising:
   a first material, said first material having a first side and a second side, said first side of said first material for the printing of information thereon;
   a second material, said second material being disposed adjacent said second side of said first material, said second material comprising:
   a sheet material, said sheet material having a first side and a second side, said first side of said sheet material being disposed towards said second side of said first material, and said second side of said sheet material being disposed away from said first material;
   a first adhesive disposed on said first side of said sheet material for bonding said sheet material to said first material;
   a second adhesive disposed on said second side of said sheet material for bonding said sheet material to a product;
   said second adhesive having a first adhesive strength for bonding of said second adhesive to a product;
   said second adhesive having a second adhesive strength for bonding of said second adhesive to said second side of said sheet material; and
   said second adhesive strength for bonding of said sheet material and said second adhesive being greater than said first adhesive strength for bonding of said second adhesive and a product for maintaining at least a substantial portion of said second adhesive on said sheet material upon removal of said label from a product.

2. The label according to claim 1, wherein:
   said first adhesive has an adhesive strength for bonding said sheet material to said first material; and
   said adhesive strength of said first adhesive between said sheet material and said first material being greater than said first adhesive strength of said second adhesive between said second adhesive and a product to maintain bonding between said first material and said sheet material when removing said label from a product.

3. The label according to claim 2, wherein said sheet material comprises at least one of:
   glassine paper;
   high-gloss paper;
   polyethylene film; and
   aluminum foil.

4. The label according to claim 3, wherein said label further comprises:
   a peel-away backing material disposed on said second adhesive, said peel-away backing material being peelable off of said second adhesive to expose said second adhesive of the label for adherance of said second adhesive to a product.

5. The label according to claim 4, wherein:
   said peel-away backing has a first side disposed towards said second adhesive of said second material, and a second side disposed away from said second adhesive; and
   at least said first side of said peel-away backing comprises a silicon coating for providing minimal adhesion between said second adhesive and said peel-away backing.

6. The label according to claim 5, wherein said sheet material of said second material comprises a first sheet material, said label comprises a label for protecting a product from theft, and said first material further comprises:
   a second sheet material, said second sheet material comprising a first side and a second side, said first side of said second sheet material comprises said first side of said first material;
   a nickel film disposed on said second side of said second sheet material;
   a polyester film disposed on said nickel film; and
   a layer of soft magnetic material sputtered on said polyester film, said layer of soft magnetic material comprising said second side of said first material.

7. The label according to claim 6, wherein said first sheet material comprises glassine paper.

8. The label according to claim 6, wherein said first sheet material comprises high-gloss paper.

9. The label according to claim 6, wherein said first sheet material comprises polyethylene film.

10. The label according to claim 6, wherein said first sheet material comprises aluminum foil.

11. The label according to claim 3, wherein said sheet material of said second material comprises a first sheet material, said label comprises a label for protecting a product against theft, and said first material further comprises:
a second sheet material, said second sheet material having a first side and a second side, said first side of said second sheet material comprising said first side of said first material;
a nickel film disposed on said second side of said second sheet material;
a polyester film disposed on said nickel film; and
a layer of soft magnetic material sputtered on said polyester film, said layer of soft magnetic film comprising said second side of said first material.

12. The label according to claim 11, wherein:
said second sheet material comprises one of: paper, thermal paper, and polypropylene;
said first adhesive comprises a first chemical composition;
said second adhesive comprises a second chemical composition, said second chemical composition comprises said first chemical composition plus an adhesive softener; and
said first sheet material comprises a material which prevents migration of said softener from said second adhesive into said first adhesive.

13. The label according to claim 2, further comprising:
a peel-away backing material disposed on said second adhesive, said peel-away backing material being peelable off of said second adhesive to expose said second adhesive of the label;
said peel-away backing material having a first side disposed towards said second adhesive, and a second side disposed away from said second adhesive; and
at least said first side of said peel-away backing material comprises a silicon coating to minimize adhesion between said peel-away backing material and said second adhesive.

14. A self-adhesive label, such as a price tag label, for being adhered to, and removed from a product, said label comprising:
a first material, said first material having a first side and a second side, said first side of said first material for the printing of information thereon;
a second material, said second material being disposed adjacent said second side of said first material, said second material comprising:
a sheet material, said sheet material having a first side and a second side, said first side of said sheet material being disposed towards said second side of said first material, and said second side of said sheet material being disposed away from said first material;
a first adhesive disposed on said first side of said sheet material for bonding said sheet material to said first material, said first adhesive providing an adhesion between said first material, said first adhesive, and said sheet material;
a second adhesive disposed on said second side of said sheet material for bonding said sheet material to a product, said second adhesive having:
an adhesion to a product; and
an adhesion to said second side of said sheet material;
at least said second side of said sheet material comprises a material providing stronger adhesion to said second adhesive than the adhesion of said second adhesive to a product, for maintaining said second adhesive on said sheet material when removing said label from a product; and
the adhesion between said first material, said first adhesive and said sheet material being greater than the adhesion of said second adhesive to said sheet material, for maintaining adhesion between said first material and said sheet material when removing said label from a product.

15. The label according to claim 14, wherein:
said first adhesive comprises a first chemical composition;
said second adhesive comprises a second chemical composition, said second chemical composition comprises an adhesive softener for making said second adhesive have a weaker adhesion than said first adhesive; and
said sheet material comprises a material which prevents migration of said softener from said second adhesive into said first adhesive.

16. The label according to claim 15, wherein:
said second chemical composition comprises said first chemical composition plus said softener;
said sheet material comprises at least one of:
glassine paper;
high-gloss paper;
polyethylene film; and
aluminum foil.

17. The label according to claim 16 wherein said label further comprises:
a peel-away backing material disposed on said second adhesive, said peel-away backing material being peelable off of said second adhesive to expose said second adhesive of the label for adherance of said second adhesive to a product;
said peel-away backing has a first side disposed towards said second adhesive of said second material, and a second side disposed away from said second adhesive; and
at least said first side of said peel-away backing comprises a silicon coating for providing minimal adhesion between said second adhesive and said peel-away backing.

18. A self-adhesive label, such as a price tag label, for being adhered to, and removed from a product, and for providing protection of the product from theft, said label comprising:
a first material, said first material comprising:
a first sheet material, said first sheet material having a first side and a second side, said first side of said first sheet material for the printing of information thereon;
a nickel film disposed on said second side of said first sheet material;
a polyester film disposed on said nickel film; and
a layer of soft magnetic material sputtered on said polyester film;
a second material, said second material being disposed adjacent said layer of soft magnetic material, said second material comprising:
a second sheet material, said second sheet material having a first side and a second side, said first side of said second sheet material being disposed towards said first material, and said second side of said sheet material being disposed away from said first material;

a first adhesive disposed on said first side of said sheet material for bonding said sheet material to said first material, said first adhesive providing an adhesion between said first material, said first adhesive, and said sheet material;

a second adhesive disposed on said second side of said sheet material for bonding said sheet material to a product, said second adhesive having:
an adhesion to a product; and
an adhesion to said second side of said sheet material;
at least said second side of said sheet material comprises a material providing stronger adhesion to said second adhesive than the adhesion of said second adhesive to a product, for maintaining said second adhesive on said sheet material when removing said label from a product; and
the adhesion between said first material, said first adhesive and said sheet material being greater than the adhesion of said second adhesive to said sheet material, for maintaining adhesion between said first material and said sheet material when removing said label from a product.

19. The label according to claim 18, wherein:

said first adhesive comprises a first chemical composition;

said second adhesive comprises a second chemical composition, said second chemical composition comprises said first chemical composition plus an adhesive softener; and said second sheet material comprises a material which prevents migration of said softener from said second adhesive into said first adhesive.

20. The label according to claim 19, wherein:

said second sheet material comprises at least one of:
glassine paper;
high-gloss paper;
polyethylene film; and
aluminum foil;
said label further comprises:
a peel-away backing material disposed on said second adhesive, said peel-away backing material being peelable off of said second adhesive to expose said second adhesive of the label for adherance of said second adhesive to a product;
said peel-away backing has a first side disposed towards said second adhesive of said second material, and a second side disposed away from said second adhesive; and
at least said first side of said peel-away backing comprises a silicon coating for providing minimal adhesion between said second adhesive and said peel-away backing.

* * * * *